(12) United States Patent
Chiba et al.

(10) Patent No.: US 12,493,476 B2
(45) Date of Patent: Dec. 9, 2025

(54) MONITORING DEVICE, MONITORING METHOD, AND MONITORING PROGRAM

(71) Applicant: NTT, Inc., Tokyo (JP)

(72) Inventors: Nobuhiro Chiba, Musashino (JP); Ryota Sato, Musashino (JP); Yoshiaki Nakajima, Musashino (JP); Takaaki Koyama, Musashino (JP)

(73) Assignee: NTT, Inc., Tokyo (JP)

( * ) Notice: Subject to any disclaimer, the term of this patent is extended or adjusted under 35 U.S.C. 154(b) by 4 days.

(21) Appl. No.: 18/567,365

(22) PCT Filed: Jun. 10, 2021

(86) PCT No.: PCT/JP2021/022169
§ 371 (c)(1),
(2) Date: Dec. 6, 2023

(87) PCT Pub. No.: WO2022/259477
PCT Pub. Date: Dec. 15, 2022

(65) Prior Publication Data
US 2024/0281264 A1 Aug. 22, 2024

(51) Int. Cl.
*G06F 9/445* (2018.01)
*H04L 41/0866* (2022.01)

(52) U.S. Cl.
CPC ...... *G06F 9/44505* (2013.01); *H04L 41/0866* (2013.01)

(58) Field of Classification Search
CPC .......................... G06F 9/44505; H04L 41/0866
USPC .......................................................... 709/224
See application file for complete search history.

(56) References Cited

U.S. PATENT DOCUMENTS

| 2016/0352640 | A1* | 12/2016 | Kompella | ............... H04L 63/20 |
| 2017/0041303 | A1* | 2/2017 | Trimmer | ............... H04L 63/061 |
| 2022/0292224 | A1 | 9/2022 | Kura et al. | |

FOREIGN PATENT DOCUMENTS

| JP | 2018163600 A | * | 10/2018 |
| JP | 2019-008376 A | | 1/2019 |
| JP | 2020009026 A | * | 1/2020 |
| WO | 2021/014596 A1 | | 1/2021 |

OTHER PUBLICATIONS

Uchiumi et al., "Automatic configuration for cloud computing infrastructure using decision tree", IEICE Technical Report, vol. 113, No. 86, Jun. 10, 2013, pp. 35-40 (7 pages including English Abstract).

* cited by examiner

*Primary Examiner* — Suraj M Joshi
(74) *Attorney, Agent, or Firm* — XSENSUS LLP

(57) ABSTRACT

A monitoring device includes processing circuitry configured to a configuration management tool and is used when a configuration of a device to be monitored is updated, analyze the operation instruction information, and extract a part where the configuration of the device to be monitored changes and content of the change; and create a determination criterion that defines a determination method for detecting modification of data of the device to be monitored on the basis of the part where the configuration of the device to be monitored changes and the content of the change.

8 Claims, 13 Drawing Sheets

Fig. 3

| TARGET FILE | TARGET COMMAND | OPERATION CONTENT |
|---|---|---|
| httpd | apt | FILE INSTALLATION |
| /etc/httpd/conf/httpd.conf | lineifile | SETTING CHANGE |
| dest:/etc/logrotate.d/router | copy:, content: | CHANGE OPERATION BY LOG ROTATION |
| etc/crontab | cron: | SETTING CHANGE |
| etc/crontab | curl: | FILE DOWNLOADING |
| ... | ... | ... |

Fig. 4

| TARGET SERVER | CONFIGURATION INFORMATION | DETERMINATION METHOD |
|---|---|---|
| web01_server | CONFIGURATION INFORMATION OF "web01_server" | DETERMINATION METHOD CORRESPONDING TO CONFIGURATION OF "web01_server" |
| log_server | CONFIGURATION INFORMATION OF "log_server" | DETERMINATION METHOD CORRESPONDING TO CONFIGURATION INFORMATION OF "log_server" |
| file_server | CONFIGURATION INFORMATION OF "file_server" | DETERMINATION METHOD CORRESPONDING TO CONFIGURATION INFORMATION OF "file_server" |

Fig. 5

```
      :
      :
___
hosts: web01_server
··tasks:
···name: INSTALL LATEST httpd
····apt: name=httpd state=latest
·····sudo: yes
·····sudo_user: admin
      :
      :
```
20a

Fig. 7

```
---        :
           :
hosts: web01_server
·tasks:
··name: CHANGE Listen Port FROM 80 TO 8080
······lineinfile:
········path: /etc/httpd/conf/httpd.conf
········regexp: '^Listen 80S'
········line: 'Listen 8080'
······notify:
········restart httpd
           :
           :
```
20b

Fig. 9

```
                                                                    20c
  ⋮
---
hosts: log_server
·tasks:
··name: PERFORM LOG ROTATION SETTING OF syslog RECEIVED FROM router
·····copy:
·······dest: /etc/logrotate.d/router
·······content: |
··········daily         →      →      →     # PERFORM EVERY DAY
      →    ·rotate 6    →      →      →     # NUMBER OF GENERATIONS
      →    ·missingok   →      →      →     # GIVE NO ERROR
      →  ···dataext     →      →      →     # DATE AT END OF OLD FILE
      →  ···dateformat_%Y·%m·%d         →   # ARBITRARY DATE FORMAT

---
hosts: file_server
 ·tasks:
 · ·name: ADD REGULARLY EXECUTED JOB
     corn:
 · · · ·name: DOWNLOAD SPECIFIED FILE
 · · · ·minute: 2
 · · · ·hour: 4
 · · · ·job: "curl http://www.example.com/log/archive.log"
 · · · ·
                            ⋮
```
20d

MONITORING DEVICE, MONITORING METHOD, AND MONITORING PROGRAM

CROSS-REFERENCE TO RELATED APPLICATION

The present application is based on PCT filing PCT/JP2021/022169, filed Jun. 10, 2021, the entire contents of which is incorporated herein by reference.

TECHNICAL FIELD

The present invention relates to a monitoring device, a monitoring method, and a monitoring program.

BACKGROUND ART

The Red Hat Package Manager (RPM) has been conventionally used to monitor modification of a file used by a system. In the RPM, static analysis is performed on a file package set in the system to generate a determination criterion used for monitoring modification of the file. There is also a related art that reflects, in a determination criterion, a difference between a state of a file before a setting change operation of a system and a state of the file serving as an operation result of the setting change by an operator.

CITATION LIST

Patent Literature

Patent Literature 1: JP 2019-008376 A
Patent Literature 2: WO 2021/014596 A

SUMMARY OF INVENTION

Technical Problem

In a case of using the RPM, it is possible to generate a determination criterion corresponding to binary of a file or the like by performing static analysis on a file package. However, regarding a file that is changed after an installation operation and is then used, such as a setting file, a determination criterion that reflects the operation result is not generated, and it is necessary to manually create or update the determination criterion on the basis of the file that reflects a setting.

In the related art that reflects, in a determination criterion, a difference between a state of a file before a setting change operation of a system and a state of the file serving as an operation result of the setting change by an operator, the operation result by the operator is believed. Thus, security concerns arise.

The present invention has been made in view of the above, and an object thereof is to easily generate a determination criterion used for monitoring modification of a file.

Solution to Problem

In order to solve the above-described problem and achieve the object, a monitoring device according to the present invention includes: processing circuitry configured to: acquire operation instruction information that is input to a configuration management tool and is used when a configuration of a device to be monitored is updated, analyze the operation instruction information, and extract a part where the configuration of the device to be monitored changes and content of the change; and create a determination criterion that defines a determination method for detecting modification of data of the device to be monitored on the basis of the part where the configuration of the device to be monitored changes and the content of the change.

Advantageous Effects of Invention

The present invention can easily generate a determination criterion used for monitoring modification of a file.

BRIEF DESCRIPTION OF DRAWINGS

FIG. 3 illustrates an example of a data structure of an operation information DB.
FIG. 4 illustrates an example of a data structure of a change information DB.
FIG. 5 illustrates an example of operation instruction information for software installation.
FIG. 7 illustrates an example of operation instruction information for changing a setting value in a file.
FIG. 9 illustrates an example of operation instruction information for log saving.
FIG. 11 illustrates an example of operation instruction information for scheduled job registration.

DESCRIPTION OF EMBODIMENTS

Hereinafter, an embodiment of a monitoring device, a monitoring method, and a monitoring program disclosed in the present application will be described in detail with reference to the drawings. Note that the present invention is not limited to the embodiment.

Embodiment

Figure 1:
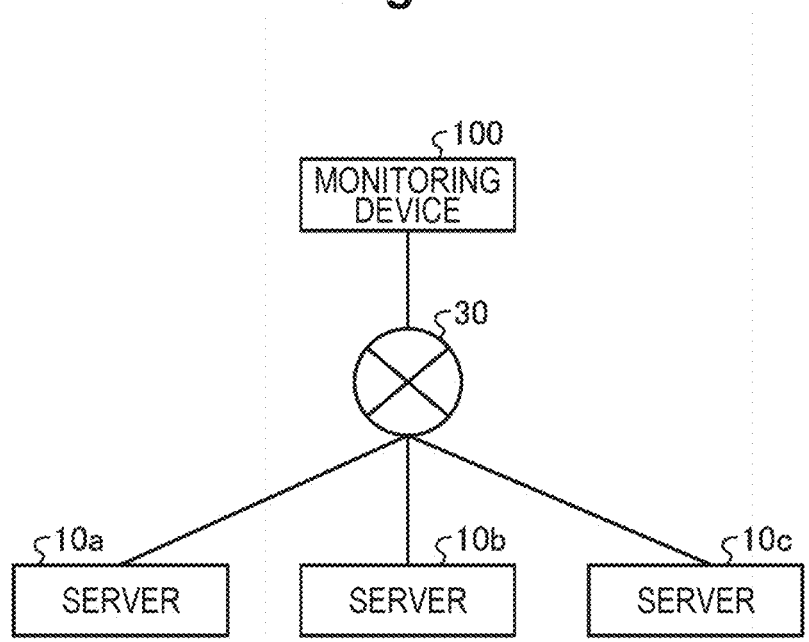
FIG. 1 illustrates an example of a monitoring system according to the present embodiment.

FIG. 1 illustrates an example of a monitoring system according to the present embodiment. As illustrated in FIG. 1, the monitoring system includes servers 10a, 10b, and 10c and a monitoring device 100. The servers 10a to 10c and the monitoring device 100 are connected to each other via a network 30.

The example of FIG. 1 shows the servers 10a to 10c, but other servers or devices may be included in the monitoring system. In the following description, the servers 10a to 10c will be collectively referred to as the server 10 as appropriate.

The server 10 receives an access from a client terminal (not illustrated) and performs various services. In the monitoring system, a configuration, a setting file, and the like of the server 10 are updated on the basis of operation instruction information input to a configuration management tool such as Ansible (registered trademark). Examples of the operation instruction information include an operation of installing, updating, or deleting software, an operation of changing a parameter in a setting file, an operation of replacing a setting file, an operation of acquiring or updating a necessary file, an operation of saving or deleting a log, a file, and a directory, an operation of adding, changing, or deleting an account, an operation of setting a scheduled job, and an operation of registering, changing, or deleting a service.

The monitoring device 100 analyzes the operation instruction information, selects a monitoring range, a determination method for detecting modification, and an appropriate determination timing and automatically generates a determination criterion that defines a correct state of the server 10. The monitoring device 100 monitors the server 10 on the basis of the determination criterion.

Figure 2:
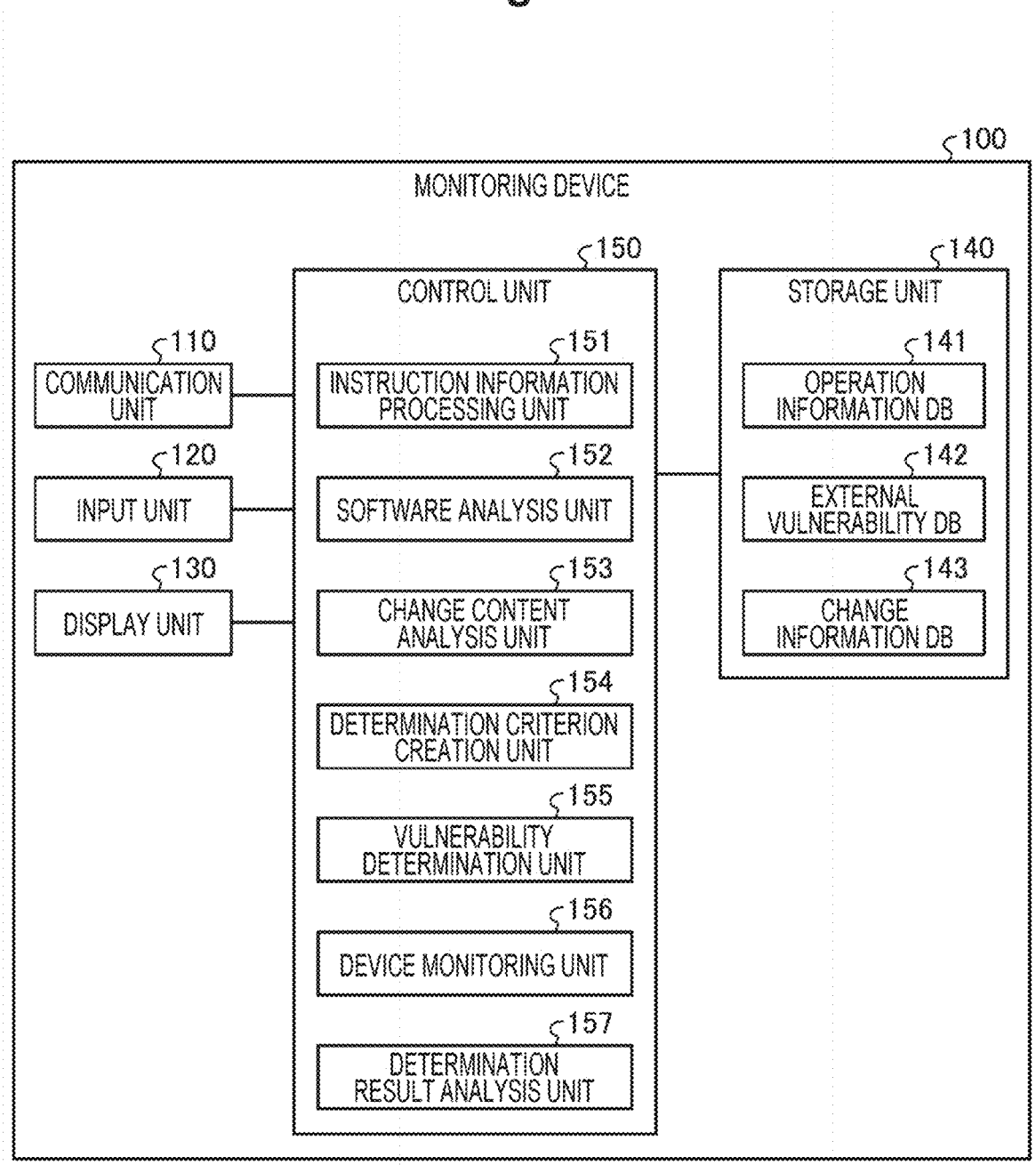
FIG. 2 is a functional block diagram illustrating a configuration of a monitoring device according to the present embodiment.

FIG. 2 is a functional block diagram illustrating a configuration of the monitoring device according to the present embodiment. As illustrated in FIG. 2, the monitoring device 100 includes a communication unit 110, an input unit 120, a display unit 130, a storage unit 140, and a control unit 150.

The communication unit 110 is a communication interface that transmits and receives various types of information to and from the server 10 connected via the network 30 or the like. The communication unit 110 is implemented by a network interface card (NIC) or the like and performs communication between an external device and the control unit 150 via a telecommunication line such as a local area network (LAN) or the Internet.

The input unit 120 is an input interface that receives various operations from an operator of the monitoring device 100. For example, the input unit includes an input device such as a keyboard or a mouse.

The display unit 130 is an output device that outputs information acquired from the control unit 150 and is implemented by a display device such as a liquid crystal display, a printing device such as a printer, or any other device.

The storage unit 140 is implemented by a semiconductor memory element such as a random access memory (RAM) or a flash memory or a storage device such as a hard disk or an optical disk. The storage unit 140 includes an operation information data base (DB) 141, an external vulnerability DB 142, and a change information DB 143.

The operation information DB 141 holds information regarding operation content corresponding to a file to be updated in response to the operation instruction information and a command for performing update. In the following description, the file to be updated in response to the operation instruction information will be referred to as "target file". The command for updating the file to be updated in response to the operation instruction information will be referred to as "target command".

FIG. 3 illustrates an example of a data structure of the operation information DB. As illustrated in FIG. 3, the operation information DB is associated with target files, target commands, and operation content. For example, operation content corresponding to a target file "httpd" and a target command "apt" is "file installation".

The external vulnerability DB 142 holds vulnerability information regarding the target file. For example, "xy vulnerability, yy vulnerability" or the like is set as vulnerability corresponding to the target file "httpd".

The change information DB 143 holds configuration information of the server 10 to be monitored. FIG. 4 illustrates an example of a data structure of the change information DB. As illustrated in FIG. 4, the change information DB 143 associates the server 10 (hereinafter, target server) whose configuration is to be updated in response to the operation instruction information, configuration information of the target server, and a determination method with each other. The configuration information of the change information DB 143 includes, for example, configurations of files set in the target server, a file path to each file, and a hash value of each file.

The determination method is set for each type of file set in the target server and includes integrity confirmation for confirming matching/mismatching of the configurations with a granularity of binary, configuration confirmation for confirming matching/mismatching of the configurations in units of files, and the like.

The description returns to FIG. 2. The control unit 150 is implemented by using a central processing unit (CPU) or the like. The control unit 150 includes an instruction information processing unit 151, a software analysis unit 152, a change content analysis unit 153, a determination criterion creation unit 154, a vulnerability determination unit 155, a device monitoring unit 156, and a determination result analysis unit 157.

When acquiring the operation instruction information from the communication unit 110, the input unit 120, or the like, the instruction information processing unit 151 analyzes the operation instruction information by using the operation information DB 141 and extracts a part where the configuration of the server 10 to be monitored is changed and content of the change. For example, the instruction information processing unit 151 extracts the type of a file to be operated, a software package to be introduced, and operation content thereof.

The software analysis unit 152 determines a determination method for the target server corresponding to the operation content and the software package extracted by the instruction information processing unit 151 and outputs the determination method to the determination criterion creation unit 154.

The change content analysis unit 153 uses the change information DB 143 to determine a determination method corresponding to the type of the file extracted by the instruction information processing unit 151 and outputs the determination method to the determination criterion creation unit 154.

The determination criterion creation unit 154 creates a determination criterion by using the determination method acquired from the software analysis unit 152 or the change content analysis unit 153. For example, in a case where the determination method is the configuration confirmation, the determination criterion creation unit 154 creates a determination criterion for confirming the configurations of the files set in the target server in units of files. In a case where the determination method is the integrity confirmation, the determination criterion creation unit 154 converts each file set in the target server into a hash value and creates a determination criterion for comparing the hash value with an appropriate hash value. The determination criterion creation unit 154 outputs the determination criterion to the device monitoring unit 156.

For example, the determination criterion includes a target server, a target file, a determination method (configuration confirmation or integrity confirmation) performed on each target file, and a frequency of performing the configuration confirmation or the integrity confirmation. The determination criterion also includes a set of appropriate configurations for performing the configuration confirmation, a hash value of each file for performing the integrity confirmation, and the like.

In response to a request from the determination criterion creation unit 154, the vulnerability determination unit 155 acquires vulnerability information regarding an introduced software from the external vulnerability DB 142 and outputs the acquired vulnerability information to the determination criterion creation unit 154. The determination criterion creation unit 154 updates the determination criterion on the basis of the vulnerability information. For example, the determination criterion creation unit 154 optimizes priority of the integrity confirmation or the frequency of the confirmation in accordance with a risk of the introduced software.

The device monitoring unit 156 monitors the target server by using the determination criterion. In a case where the determination criterion includes the configuration confirmation, the device monitoring unit 156 identifies whether or not a set of appropriate configurations set in the determination criterion matches with a set of configurations of the files of the target server. For example, in a case where the configurations of the configuration confirmation specified in the determination criterion are a file A1, a file A2, and a file A3, and the configurations of the files of the target server are the file A1, the file A3, and a file A4, the configurations of the files do not match.

In a case where the determination criterion includes the integrity confirmation, the device monitoring unit 156 determines whether or not a set of appropriate hash values set in the determination criterion matches with a set of hash values calculated based on the configuration (each set file) of the target server. For example, even in a case where the configurations of the configuration confirmation specified in the determination criterion are the file A1, the file A2, and the file A3, and the configurations of the files of the target server are the file A1, the file A2, and the file A3, that is, the configurations match, if a hash value of the file A3 of the determination criterion is different from a hash value of the file A3 of the target server, the files do not match from the viewpoint of integrity.

The device monitoring unit 156 performs monitoring based on the determination criterion and, in a case where the determination criterion is not satisfied, outputs various types of information regarding a determination result to the determination result analysis unit 157.

The determination result analysis unit 157 acquires information regarding the determination result from the device monitoring unit 156 and reflects a changed configuration in the change information DB 143.

Next, an example of processing performed by the monitoring device 100 in response to each piece of the operation instruction information will be described. Hereinafter, an example of installing software, an example of changing a setting value in a file, an example of saving a log, and an example of registering a scheduled job will be described in order.

An example of processing of the monitoring device 100 performed in a case where operation instruction information for software installation is acquired will be described. FIG. 5 illustrates an example of the operation instruction information for software installation. In operation instruction information 20*a* for software installation, a target server "web01_server" is specified by "hosts:". A name of a software package to be introduced is specified by "apt: name". The latest version is specified by "state=latest".

Upon receiving the operation instruction information 20*a*, the instruction information processing unit 151 extracts the target file "httpd" and the target command "apt" from the operation instruction information 20*a* and identifies operation content "file installation" corresponding to the extracted target file and target command from the operation information DB 141. The instruction information processing unit 151 outputs the target server, the identified operation content, and the name of the software package (httpd) to be introduced to the software analysis unit 152.

The software analysis unit 152 determines a determination method for the target server corresponding to the operation content and the software package extracted by the instruction information processing unit 151 and outputs the determination method to the determination criterion creation unit 154. The determination method corresponding to the operation content and the software package may be set in advance, or the determination method corresponding to the operation content and the software package may be identified by using an existing static analysis tool or the like. A technique related to the existing static analysis tool is disclosed in Patent Literature (JP 2019-008376 A) or the like.

The determination method determined by the software analysis unit 152 includes the target server (web01_server), the target file (httpd), and configuration confirmation regarding the target file, and integrity confirmation regarding the target file. The determination method determined by the software analysis unit 152 also includes information regarding a set of appropriate configurations regarding the target file and a hash value of each file for performing the integrity confirmation.

The determination criterion creation unit 154 creates a determination criterion by using the determination method acquired from the software analysis unit 152 and outputs the created determination criterion to the device monitoring unit 156. Note that the determination criterion creation unit 154 outputs information regarding the target file to the vulnerability determination unit 155 to request vulnerability information of the target file.

The vulnerability determination unit 155 acquires the vulnerability information corresponding to the information of the target file from the external vulnerability DB 142 and calculates a vulnerability risk score (low, medium, or high). The vulnerability determination unit 155 identifies the risk score by using a table for identifying the risk score corresponding to the vulnerability information and outputs the identified risk score to the determination criterion creation unit 154.

The determination criterion creation unit 154 updates the determination criterion in a case where the risk score received from the vulnerability determination unit 155 is "high". For example, the determination criterion creation unit 154 sets a frequency of performing the integrity confirmation set in the determination criterion to a frequency higher than a normal frequency. The determination criterion creation unit 154 may optimize priority of the integrity confirmation. The determination criterion creation unit 154 outputs the updated determination criterion to the device monitoring unit 156.

The device monitoring unit 156 monitors the target server by using the determination criterion (or the updated determination criterion). In a case where the determination criterion includes the configuration confirmation, the device monitoring unit 156 identifies whether or not a set of appropriate configurations set in the determination criterion matches with a set of configurations of the target files of the target server. In a case where the determination criterion includes the integrity confirmation, the device monitoring unit 156 determines whether or not a set of appropriate hash values set in the determination criterion matches with a set of hash values calculated based on each configuration of the target file of the target server.

Figure 6:
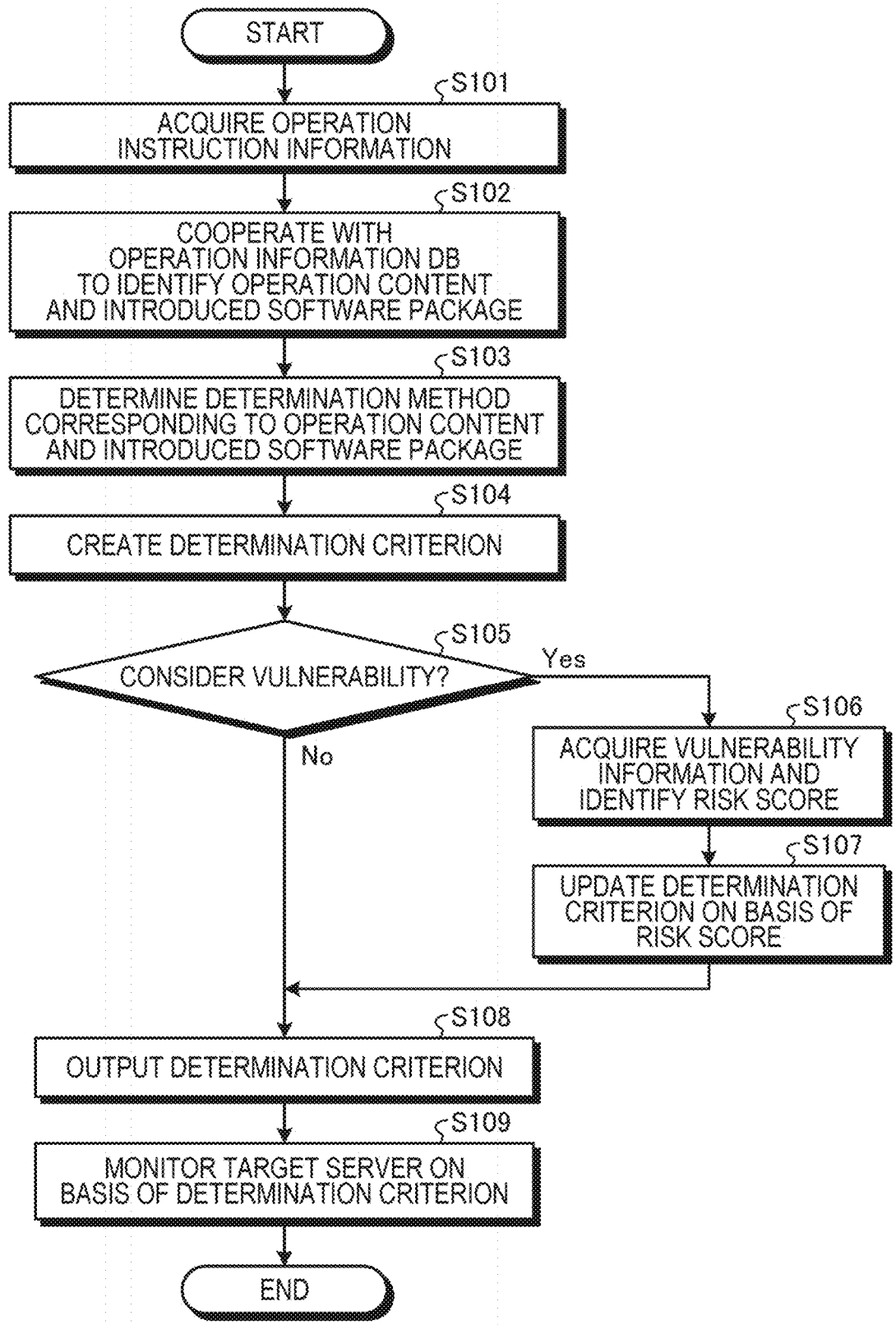
FIG. 6 is a flowchart (1) showing a processing procedure of a monitoring device.

Here, a processing procedure of the monitoring device 100 performed in a case where operation instruction information for software installation is acquired will be described. FIG. 6 is a flowchart (1) showing the processing procedure of the monitoring device. As shown in FIG. 6, the instruction information processing unit 151 of the monitoring device 100 acquires the operation instruction information 20*a* (step S101).

The instruction information processing unit 151 cooperates with the operation information DB 141 to identify operation content and an introduced software package (step S102). The software analysis unit 152 of the monitoring device 100 determines a determination method corresponding to the operation content and the introduced software package (step S103).

The determination criterion creation unit 154 of the monitoring device 100 creates a determination criterion on the basis of the determination method (step S104). When the vulnerability is not considered (step S105, No), the monitoring device 100 proceeds to step S108. When the vulnerability is considered (step S105, Yes), the monitoring device 100 proceeds to step S106.

The vulnerability determination unit 155 of the monitoring device 100 acquires vulnerability information of the target file from the external vulnerability DB 142 and identifies a risk score (step S106). The determination criterion creation unit 154 updates the determination criterion on the basis of the risk score (step S107).

The determination criterion creation unit 154 outputs the determination criterion to the device monitoring unit 156 (step S108). The device monitoring unit 156 monitors the target server on the basis of the determination criterion (step S109).

Then, an example of processing of the monitoring device 100 performed in a case where operation instruction information for changing a setting value in a file is acquired will be described. FIG. 7 illustrates the example of operation instruction information for changing a setting value in a file. In operation instruction information 20*b* for changing a setting value in a file, the target server "web01 server" is specified by "hosts:". A change of content of the file is specified by "lineinfile". A current value is indicated by "regexp:", and a changed value is indicated by "line:".

Upon receiving the operation instruction information 20*b*, the instruction information processing unit 151 extracts the target server "web01_server", the type of the target file (setting file) "/etc/httpd/conf/httpd.conf", and target commands "lineinfile", "regexp", and "line" from the operation instruction information 20*b*. The instruction information processing unit 151 identifies operation content "setting change" corresponding to the extracted type of the target file and target commands from the operation information DB 141. The instruction information processing unit 151 outputs the target server, the setting file, and the operation content (setting change: current value and changed value) to the change content analysis unit 153.

The instruction information processing unit 151 may recognize an extension of the file written in path to identify the type of the file to be operated "/etc/httpd/conf/httpd.conf".

The change content analysis unit 153 identifies a determination method corresponding to the target server and the setting file by using the change information DB 143. Further, the change content analysis unit 153 acquires the setting file whose setting has not been changed from the change information DB 143 and updates the current value to the changed value according to the setting change. The change content analysis unit 153 calculates a hash value on the basis of the changed setting file. The change content analysis unit 153 sets the hash value of the changed setting file as an appropriate hash value for the integrity confirmation. The change content analysis unit 153 outputs the determination method to the determination criterion creation unit 154.

The determination criterion creation unit 154 creates a determination criterion by using the determination method acquired from the change content analysis unit 153 and outputs the created determination criterion to the device monitoring unit 156.

The device monitoring unit 156 monitors the setting file of the target server by using the determination criterion. In a case where the determination criterion includes the configuration confirmation, the device monitoring unit 156 identifies whether or not a set of appropriate configurations set in the determination criterion matches with a set of configurations of setting files of the target server. In a case where the determination criterion includes the integrity confirmation, the device monitoring unit 156 determines whether or not a set of appropriate hash values set in the determination criterion (hash values set in consideration of update) matches with a set of hash values calculated based on each configuration of the setting file of the target server.

Here, the device monitoring unit 156 performs the configuration confirmation and the integrity confirmation, and, in a case where the configurations of the setting files do not match (in a case where modification of any setting file is detected), the device monitoring unit outputs the corresponding target server, information regarding the modified setting file, and the operation instruction information 20*b* to the determination result analysis unit 157.

The determination result analysis unit 157 updates the change information DB 143 on the basis of the information acquired from the device monitoring unit 156. For example, the determination result analysis unit 157 acquires information regarding the latest setting file from the target server and updates the information regarding the setting file of the target server included in the change information DB 143. The determination result analysis unit 157 may extract a terminal that creates the operation instruction information 20*b* from the operation instruction information 20*b* and display the terminal on the display unit 130 as a confirmation terminal. The operation instruction information 20*b* includes information regarding a terminal that creates the operation instruction information 20*b* (the same applies to other types of operation instruction information).

Figure 8:
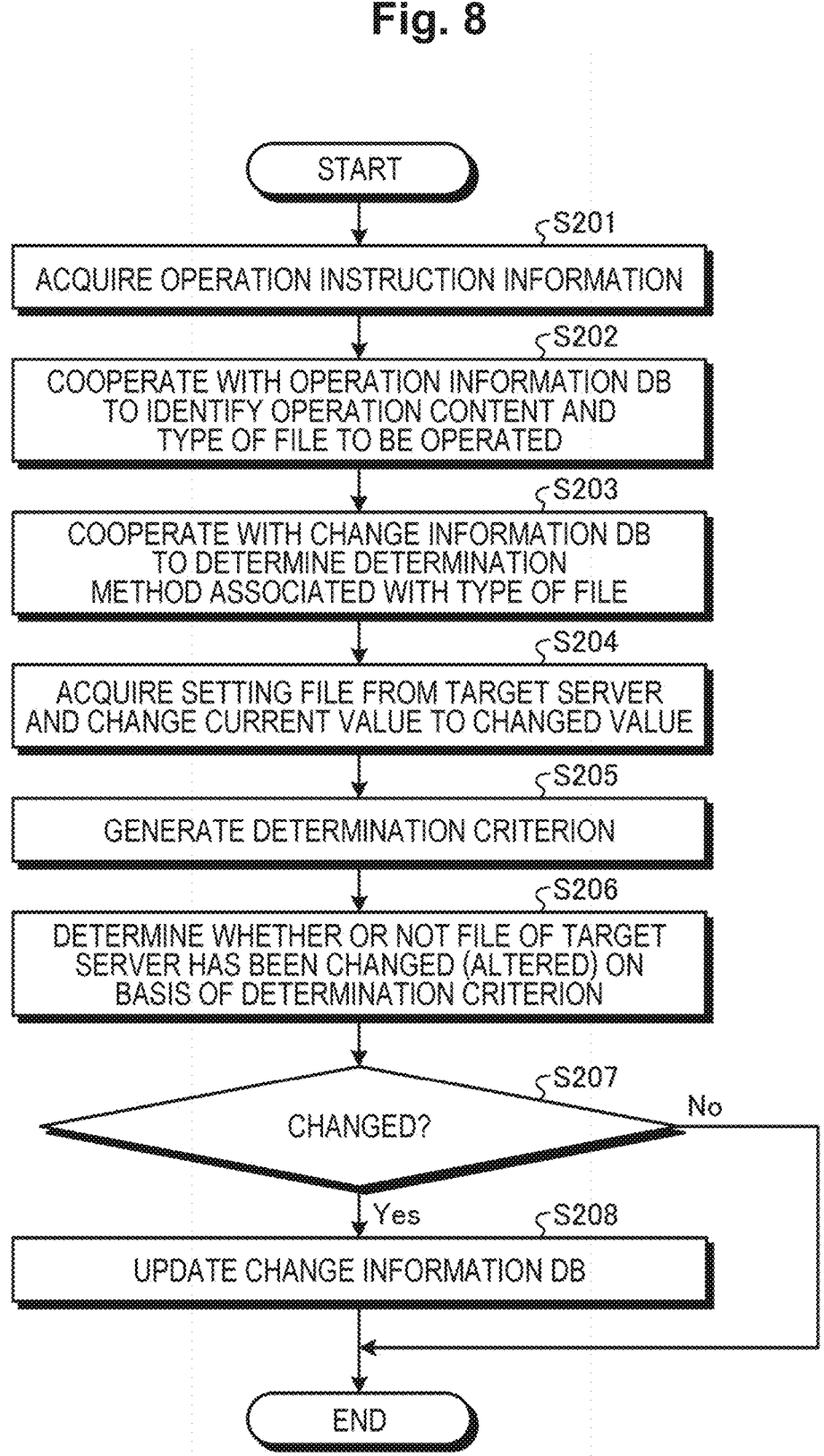
FIG. 8 is a flowchart (2) showing a processing procedure of a monitoring device.

Here, a processing procedure of the monitoring device 100 performed in a case where operation instruction information for changing a setting value in a file is acquired will be described. FIG. 8 is a flowchart (2) showing the processing procedure of the monitoring device. As shown in FIG. 8, the instruction information processing unit 151 of the monitoring device 100 acquires operation instruction information (step S201). The instruction information processing unit 151 cooperates with the operation information DB 141 to identify operation content and the type of a file to be operated (setting file) (step S202).

The change content analysis unit 153 of the monitoring device 100 cooperates with the change information DB 143 to determine a determination method associated with the type of the file (step S203). The change content analysis unit 153 acquires the setting file from the target server and changes a current value to a changed value (step S204).

The determination criterion creation unit 154 of the monitoring device 100 generates a determination criterion (step S205). The device monitoring unit 156 of the monitoring device 100 determines whether or not the file of the target server has been changed (modified) on the basis of the determination criterion (step S206).

When the file of the target server has not been changed (step S207, No), the monitoring device 100 terminates the processing. Meanwhile, when the file of the target server has been changed (step S207, Yes), the determination result analysis unit 157 of the monitoring device 100 updates the change information DB 143 (step S208).

Then, an example of processing of the monitoring device 100 performed in a case where operation instruction information for log saving is acquired will be described. FIG. 9 illustrates the example of operation instruction information for log saving. In operation instruction information 20c for log saving, a target server "log_server" is specified by "hosts:". A setting file "/etc/logrotate.d/router" to be generated is specified by "dest:". The fact that a value of a log rotation setting written in the file is specified is indicated by "content:".

Upon receiving the operation instruction information 20c, the instruction information processing unit 151 extracts the target server "log_server", the type of the target file (setting file) "/etc/logrotate.d/router", and target commands "copy" and "content:" from the operation instruction information 20c. The instruction information processing unit 151 identifies operation content "change operation by log rotation" corresponding to the extracted type of the target file and target commands from the operation information DB 141. The instruction information processing unit 151 outputs the target server, the setting file, and the operation content to the change content analysis unit 153.

The change content analysis unit 153 identifies a determination method corresponding to the target server and the setting file by using the change information DB 143. In consideration of a change by the log rotation, the change content analysis unit 153 adds a setting file for a logrotate service to a setting file to be monitored in the determination method. Logs of the target server are rotated every day, and thus an instruction to store logs of six generations in the target server is added to the determination method. An instruction to identify a log file to be monitored by giving a specified format to the end of a log file name (giving a date (original file name+YYYY-MM-DD)) is added to the determination method.

The change content analysis unit 153 sets a determination method of performing the configuration confirmation and the integrity confirmation for the setting file of the target server. The change content analysis unit 153 sets a determination method of setting the configuration confirmation and access source confirmation for the log file of the target server. The change content analysis unit 153 outputs the determination methods to the determination criterion creation unit 154.

The determination criterion creation unit 154 creates determination criteria by using the determination methods acquired from the change content analysis unit 153 and outputs the created determination criteria to the device monitoring unit 156. The determination criterion creation unit 154 generates a determination criterion for the setting file and a determination criterion corresponding to the log file name after rotation for confirming a log file configuration. For example, the log file name after rotation is predicted to be the original file name+date on the basis of information included in the determination method. In order to deal with the file name that changes after rotation, the determination criterion may be generated such that monitoring is performed only on the basis of the original file name, while the date at the end is simply ignored.

The device monitoring unit 156 monitors the target server by using the determination criteria. In a case where the determination criteria include the configuration confirmation, the device monitoring unit 156 identifies whether or not a set of appropriate configurations set in the determination criteria matches with a set of configurations of the target files of the target server. In a case where the determination criteria includes the integrity confirmation, the device monitoring unit 156 determines whether or not a set of appropriate hash values set in the determination criteria matches with a set of hash values calculated based on each configuration of the target file of the target server.

Figure 10:
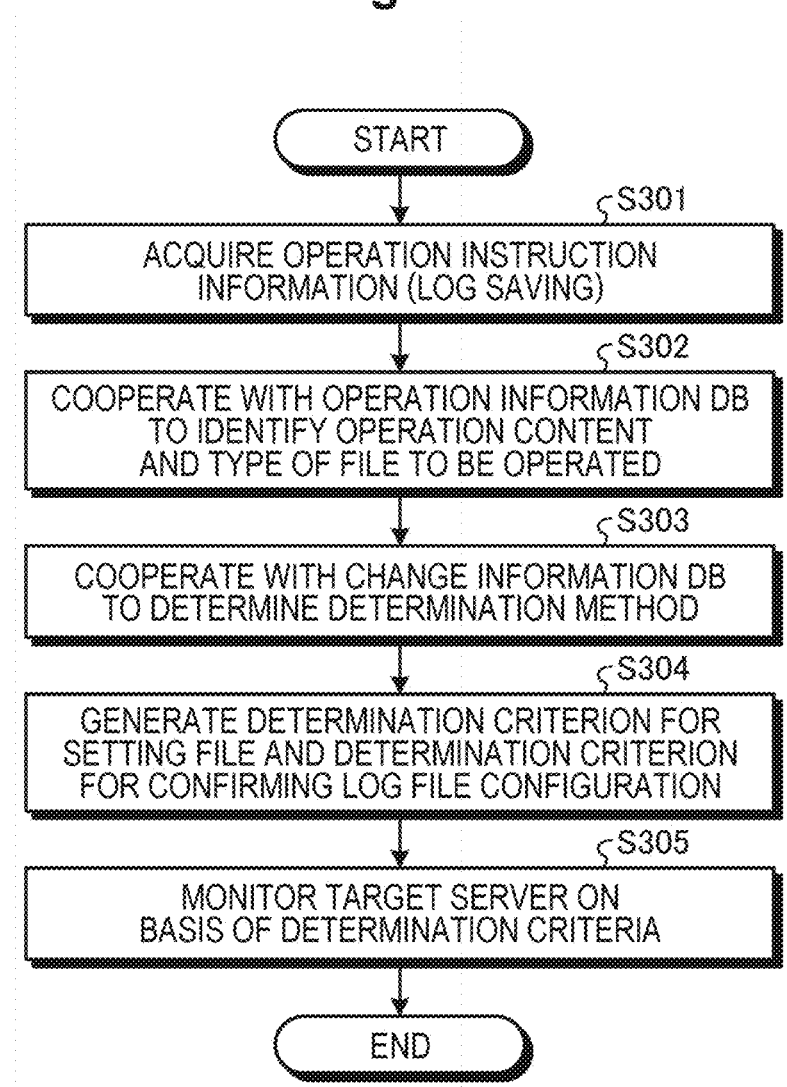
FIG. 10 is a flowchart (3) showing a processing procedure of a monitoring device.

Here, a processing procedure of the monitoring device 100 performed in a case where operation instruction information for log saving is acquired will be described. FIG. 10 is a flowchart (3) showing the processing procedure of the monitoring device. As shown in FIG. 10, the instruction information processing unit 151 of the monitoring device 100 acquires the operation instruction information 20c (log saving) (step S301).

The instruction information processing unit 151 cooperates with the operation information DB 141 to identify operation content and the type of a file to be operated (setting file) (step S302). The change content analysis unit 153 of the monitoring device 100 cooperates with the change information DB 143 to determine a determination method (step S303).

The determination criterion creation unit 154 of the monitoring device 100 generates a determination criterion for the setting file and a determination criterion for confirming a log file configuration (step S304). The device monitoring unit 156 of the monitoring device 100 determines whether or not the file of the target server has been changed (modified) on the basis of the determination criteria (step S305).

Then, an example of processing of the monitoring device 100 performed in a case where operation instruction information for scheduled job registration is acquired will be described. FIG. 11 illustrates an example of the operation instruction information for scheduled job registration. In operation instruction information 20d for scheduled job registration, the target server "file_server" is specified by "hosts:". Regular execution is specified by "cron:", an execution timing is specified by "minute:" and "hour:", and a target command "cron" to be executed is specified by "job:". Further, downloading a file is indicated by a "curl" command in job.

Upon receiving the operation instruction information 20d, the instruction information processing unit 151 extracts the target server "file_server", the target file "/etc/crontab", and the target commands "cron" and "curl:" from the operation instruction information 20d. The instruction information processing unit 151 identifies operation content "setting change, file downloading, and regular execution" corresponding to the extracted type of the target file and target commands from the operation information DB 141. The instruction information processing unit 151 outputs the target server, the setting file, and the operation content (setting change, file downloading, and regular execution) to the change content analysis unit 153.

The change content analysis unit 153 identifies a determination method corresponding to the target server and the operation content by using the change information DB 143. For example, the change content analysis unit 153 identifies change content of a cron setting and regular execution (file downloading). The change content analysis unit 153 generates a determination method in which the configuration confirmation and the integrity confirmation are performed for the setting file to be subjected to the cron setting, and the configuration confirmation is not performed for the downloaded file before cron is executed, whereas the configuration confirmation is performed therefor after cron is executed. The change content analysis unit 153 may additionally set, in the determination method, acquisition of a corresponding downloaded file at a timing of executing cron in the target server and performing of the integrity confirmation by using a hash value of the downloaded file.

The determination criterion creation unit 154 creates a determination criterion by using the determination method acquired from the change content analysis unit 153 and outputs the created determination criterion to the device monitoring unit 156. The determination criterion creation unit 154 generates a determination criterion of the setting file to be subjected to the cron setting and a determination criterion of the downloaded file. The determination criterion creation unit 154 may reflect, in the determination criterion, acquisition of a corresponding downloaded file at a timing of executing cron in the target server and performing of the integrity confirmation by using a hash value of the downloaded file.

The device monitoring unit 156 monitors the target server by using the determination criteria. In a case where the determination criteria include the configuration confirmation, the device monitoring unit 156 identifies whether or not a set of appropriate configurations set in the determination criteria matches with a set of configurations of the target files of the target server. In a case where the determination criteria include the integrity confirmation, the device monitoring unit 156 determines whether or not a set of appropriate hash values set in the determination criteria matches with a set of hash values calculated based on each configuration of the target file of the target server.

Here, when the target server regularly executes cron and a file is downloaded while the device monitoring unit 156 is monitoring the target server, it is expected that content of the file is changed. Thus, the downloaded file may be set in advance to be excluded from determination targets. As described above, in a case where a hash value of a regularly downloaded file is reflected in the determination criterion, the device monitoring unit 156 may perform the integrity confirmation on the downloaded file on the basis of the determination criterion.

At this time, a determination result NG (detection of modification to content of the file) may be output depending on a timing of the reflection in the determination criterion and monitoring in the target server. In this case, after receiving NG, the determination result analysis unit 157 cooperates with the change content analysis unit 153 to acquire a file to be downloaded at the time of regular execution and compare an integrity confirmation result (hash value) at the time of NG with a hash value of the downloaded file. In a case where the two hash values match, the determination criterion creation unit 154 updates the determination criterion with the hash value and passes the updated determination criterion to the device monitoring unit 156. The device monitoring unit 156 performs monitoring on the basis of the new determination criterion.

That is, in a case where it is identified that the configuration of the device to be monitored regularly changes, the determination criterion creation unit 154 creates the determination criterion that reflects the changed configuration again.

Figure 12:
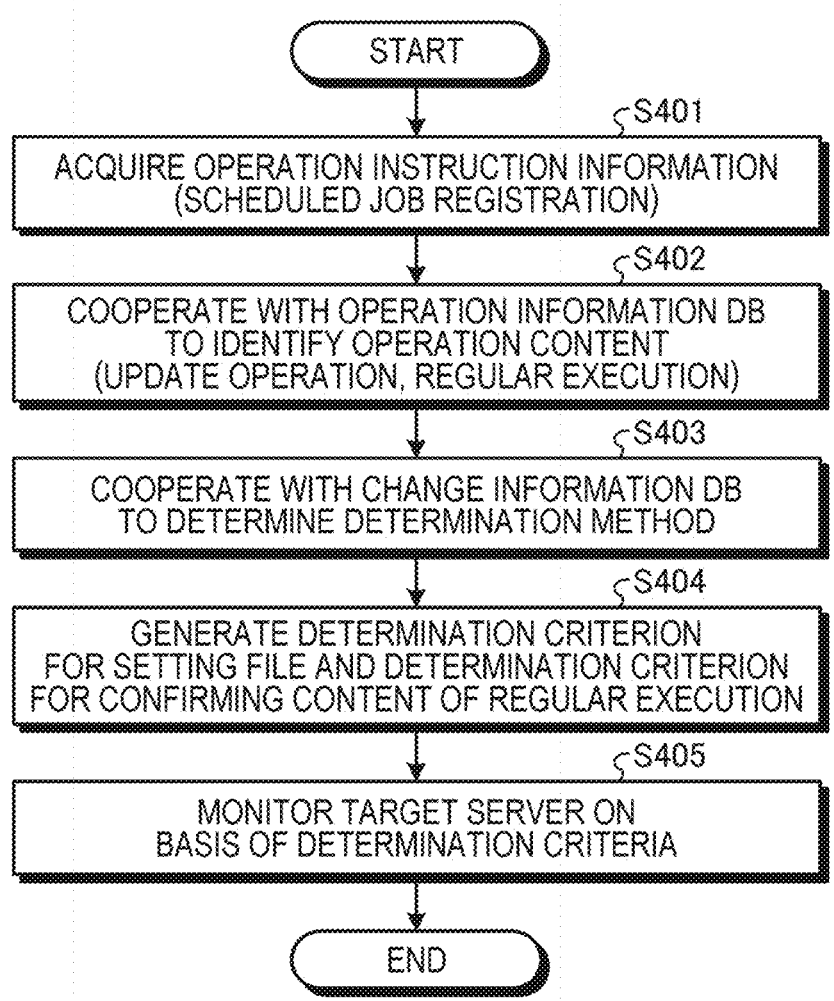
FIG. 12 is a flowchart (4) showing a processing procedure of a monitoring device.

Here, a processing procedure of the monitoring device 100 performed in a case where operation instruction information for scheduled job registration is acquired will be described. FIG. 12 is a flowchart (4) showing the processing procedure of the monitoring device. As shown in FIG. 12, the instruction information processing unit 151 of the monitoring device 100 acquires the operation instruction information 20d (scheduled job registration) (step S401).

The instruction information processing unit 151 cooperates with the operation information DB 141 to identify operation content (update operation, regular execution) (step S402). The change content analysis unit 153 of the monitoring device 100 cooperates with the change information DB 143 to determine a determination method (step S403).

The determination criterion creation unit 154 of the monitoring device 100 generates a determination criterion for the setting file and a determination criterion for confirming content of regular execution (step S404). The device monitoring unit 156 of the monitoring device 100 monitors whether or not the file of the target server has been changed (modified) on the basis of the determination criteria (step S405).

Next, effects of the monitoring device 100 according to the present embodiment will be described. The monitoring device 100 analyzes operation instruction information, selects a monitoring range, a determination method for detecting modification, and an appropriate determination timing and automatically generates a determination criterion that defines a correct state of the server 10. The monitoring device 100 monitors the server 10 on the basis of the determination criterion. This makes it possible to easily generate a determination criterion used for monitoring modification of a file and appropriately perform monitoring.

In a case where it is identified that a configuration of a device to be monitored regularly changes, the monitoring device 100 creates the determination criterion that reflects the changed configuration again. This makes it possible to detect modification even in a case where the configuration of the server 10 to be monitored regularly changes.

With the above mechanism, it is possible to automatically perform monitoring that reflects content of a setting operation using a configuration management tool immediately after the setting operation.

The change content analysis unit 153 of the monitoring device 100 may cooperate with the change information DB to further perform the following processing. When acquiring information regarding a certain setting file from the instruction information processing unit 151, the change content analysis unit 153 acquires information regarding the setting file of each target server recorded in the change information DB 143 and identifies a configuration of a common part. The change content analysis unit 153 outputs information regarding a determination method of performing configuration confirmation on the configuration of the common part to the determination criterion creation unit 154, and the determination criterion creation unit 154 creates a determination criterion for detecting modification of the common part. This makes it possible to create a determination criterion based on a highly reliable setting file used in many servers 10.

Figure 13:
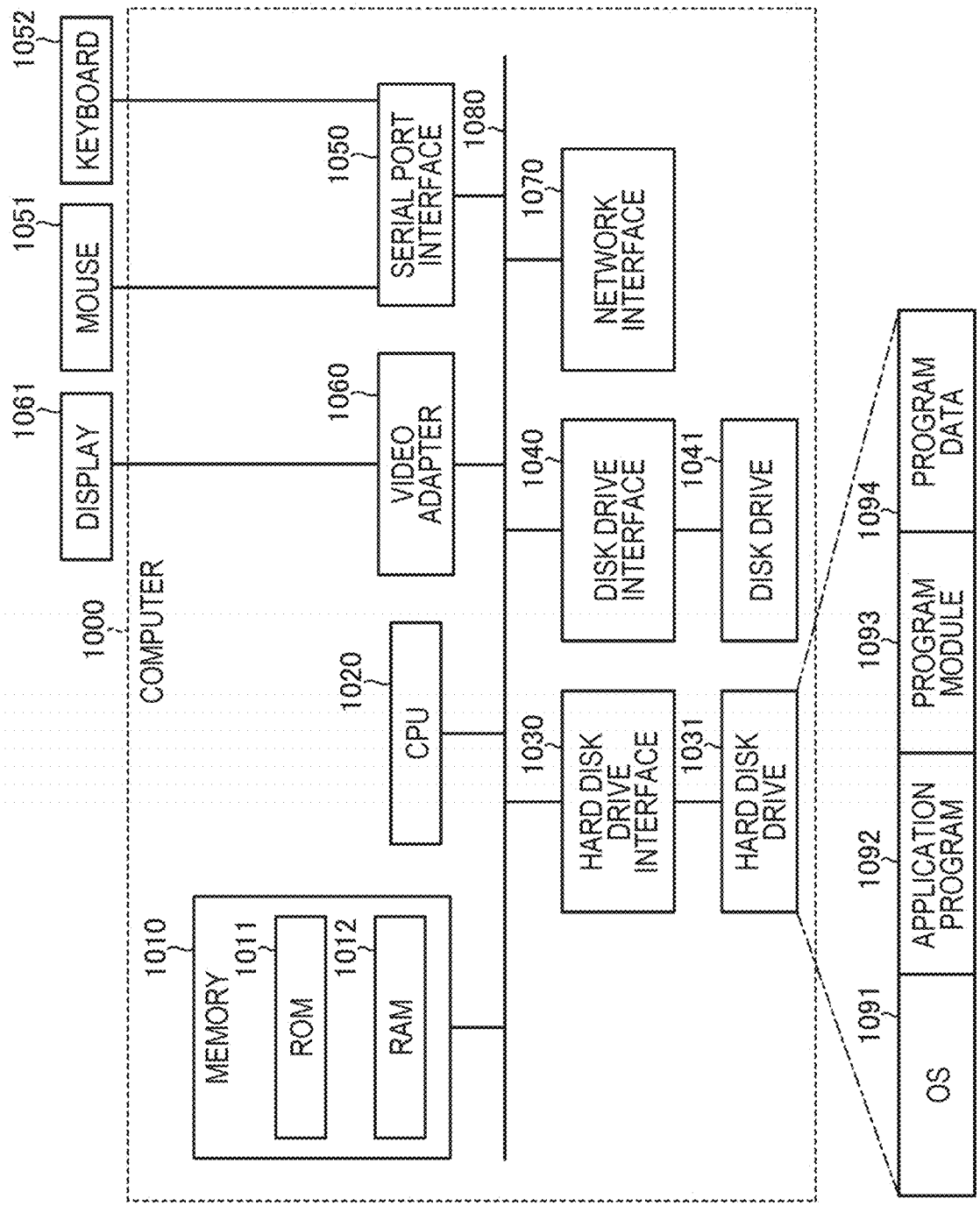
FIG. 13 illustrates an example of a computer that executes a monitoring program.

Here, an example of a computer that executes a monitoring program will be described. FIG. 13 illustrates an example of the computer that executes a monitoring program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. A removable storage medium such as a magnetic disk or an optical disk is inserted into the disk drive 1041. The serial port interface 1050 is connected to, for example, a mouse 1051 and a keyboard 1052. The video adapter 1060 is connected to, for example, a display 1061.

Here, the hard disk drive 1031 stores, for example, an OS 1091, an application program 1092, a program module 1093, and program data 1094. Each piece of information described in the above embodiment is stored in, for example, the hard disk drive 1031 or the memory 1010.

The monitoring program is stored in the hard disk drive 1031 as, for example, the program module 1093 in which commands to be executed by the computer 1000 are written. Specifically, the program module 1093 in which each type of processing performed by the monitoring device 100 described in the above embodiment is written is stored in the hard disk drive 1031.

Data used for information processing performed by the monitoring program is also stored in, for example, the hard disk drive 1031 as the program data 1094. The CPU 1020 reads, into the RAM 1012, the program module 1093 and the program data 1094 stored in the hard disk drive 1031 as necessary and performs each procedure described above.

Note that the program module 1093 and the program data 1094 regarding the monitoring program are not necessarily stored in the hard disk drive 1031 and, for example, may be stored in a removable storage medium and be read by the CPU 1020 via the disk drive 1041 or the like. Alternatively, the program module 1093 and the program data 1094 regarding the monitoring program may be stored in another computer connected via a network such as a LAN or a wide area network (WAN) and be read by the CPU 1020 via the network interface 1070.

Although the embodiments to which the invention made by the present inventors is applied have been described above, the present invention is not limited by the description and the drawings of the present embodiments showing a part of the disclosure of the present invention. In other words, other embodiments, examples, operational technologies, and the like made by those skilled in the art or the like on the basis of the present embodiments are all included in the scope of the present invention.

REFERENCE SIGNS LIST

100 Monitoring device
110 Communication unit
120 Input unit
130 Display unit
140 Storage unit
141 Operation information DB
142 External vulnerability DB
143 Change information DB
150 Control unit
151 Instruction information processing unit
152 Software analysis unit
153 Change content analysis unit
154 Determination criterion creation unit
155 Vulnerability determination unit
156 Device monitoring unit
157 Determination result analysis unit

The invention claimed is:

1. A monitoring device comprising:
processing circuitry configured to:
acquire operation instruction information that is input to a configuration management tool and is used when a configuration of a device to be monitored is updated, analyze the operation instruction information, and extract a part where the configuration of the device to be monitored changes and content of the change;
acquire vulnerability information corresponding to the operation instruction information and the part where the configuration of the device to be monitored changes; and
create a determination criterion that defines a determination method for detecting modification of data of the device to be monitored on the basis of the part where the configuration of the device to be monitored changes, the content of the change, and the vulnerability information,
wherein the determination criterion includes integrity information to check the configuration of the device and an indication of a frequency with which the configuration of the device is to be checked.

2. The monitoring device according to claim 1, wherein the processing circuitry is further configured to in a case where it is identified that the configuration of the device to be monitored regularly changes by analyzing the operation instruction information, create the determination criterion that reflects a changed configuration again.

3. The monitoring device according to claim 1, wherein the processing circuitry is further configured to compare pieces of configuration information of a plurality of devices to be monitored with each other identify a part common to a plurality of pieces of configuration information, and create a determination criterion that defines a determination method for detecting modification of the part common to the plurality of pieces of configuration information.

4. The monitoring device according to claim 1 wherein the processing circuitry is further configured to detect modification of data of the device to be monitored on the basis of the determination criterion.

5. The monitoring device according to claim 1, wherein the determination criterion includes, based on the vulnerability information, a priority setting indicating whether checking integrity of the configuration of the device or the frequency of checking the configuration of the device is prioritized.

6. The monitoring device according to claim 1, wherein the integrity information includes a hash value.

7. A monitoring method comprising:
acquiring operation instruction information that is input to a configuration management tool and is used when a configuration of a device to be monitored is updated, analyzing the operation instruction information, and extracting a part where the configuration of the device to be monitored changes and content of the change;
acquiring vulnerability information corresponding to the operation instruction information and the part where the configuration of the device to be monitored changes; and
creating a determination criterion that defines a determination method for detecting modification of data of the device to be monitored on the basis of the part where the configuration of the device to be monitored changes, the content of the change, and the vulnerability information, wherein the determination criterion includes integrity information to check the configuration of the device and an indication of a frequency with which the configuration of the device is to be checked.

8. A non-transitory computer-readable recording medium storing therein a monitoring program that causes a computer to execute a process comprising:

acquiring operation instruction information that is input to a configuration management tool and is used when a configuration of a device to be monitored is updated, analyzing the operation instruction information, and extracting a part where the configuration of the device to be monitored changes and content of the change;

acquiring vulnerability information corresponding to the operation instruction information and the part where the configuration of the device to be monitored changes; and creating a determination criterion that defines a determination method for detecting modification of data of the device to be monitored on the basis of the part where the configuration of the device to be monitored changes, the content of the change, and the vulnerability information, wherein the determination criterion includes integrity information to check the configuration of the device and an indication of a frequency with which the configuration of the device is to be checked.

* * * * *